US008284961B2

(12) United States Patent
Miyasaka et al.

(10) Patent No.: US 8,284,961 B2
(45) Date of Patent: Oct. 9, 2012

(54) SIGNAL PROCESSING DEVICE

(75) Inventors: Shuji Miyasaka, Osaka (JP); Yosiaki Takagi, Kanagawa (JP); Takeshi Norimatsu, Hyogo (JP); Akihisa Kawamura, Osaka (JP); Kojiro Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 1152 days.

(21) Appl. No.: 11/995,571

(22) PCT Filed: Jul. 10, 2006

(86) PCT No.: PCT/JP2006/313655
§ 371 (c)(1),
(2), (4) Date: Jan. 14, 2008

(87) PCT Pub. No.: WO2007/010771
PCT Pub. Date: Jan. 25, 2007

(65) Prior Publication Data

US 2009/0122182 A1 May 14, 2009

(30) Foreign Application Priority Data

Jul. 15, 2005 (JP) ................................ 2005-207755
Mar. 31, 2006 (JP) ................................ 2006-097023

(51) Int. Cl.
*H04B 1/00* (2006.01)

(52) U.S. Cl. .............. 381/119; 381/63; 381/22; 381/17; 381/98

(58) Field of Classification Search ............... 348/425.1; 375/240.01; 704/500, E19.001, 200, 23, 704/208, 219, 504, 229, 315, E19.005; 381/2, 381/18–21, 29, 307, 66, 119, 103, 99, 98, 381/97, 94.2
See application file for complete search history.

(56) References Cited

U.S. PATENT DOCUMENTS 4,646,612 A * 3/1987 Suzuki ........................... 84/607
(Continued)

FOREIGN PATENT DOCUMENTS

WO 03/090206 10/2003
(Continued)

OTHER PUBLICATIONS

David E. Joyce, "The laws of Cosines and Sines", Dept. of Mathematics and Computer Science, Clark University, 2002, p. 1-4.*
(Continued)

*Primary Examiner* — Vivian Chin
*Assistant Examiner* — Leshui Zhang
(74) *Attorney, Agent, or Firm* — Wenderoth Lind & Ponack, L.L.P.

(57) ABSTRACT

A signal processing device includes a generation unit that generates a second signal from a first signal that is obtained by down mixing two signals; a mixing coefficient determination unit that determines, based on a value L and a value θ, a mixing degree for mixing the first signal and the second signal; and a mixing unit that mixes the first signal and the second signal based on the mixing degree determined by the mixing coefficient determination unit. The generation unit includes a first filter that generates a low frequency band signal in the second signal, from a low frequency band signal in the first signal; and a second filter that generates a high frequency band signal in the second signal, from a high frequency band signal in the first signal. The first filter is a filter unit which, for a complex-number signal, de-correlates an input signal and adds a reverberation component by using a delay unit and an all pass filter, and the processing unit is a filter unit different from the first filter.

8 Claims, 7 Drawing Sheets

U.S. PATENT DOCUMENTS

2005/0254446 A1 * 11/2005 Breebaart .................... 370/315

FOREIGN PATENT DOCUMENTS

WO 2006/022124 3/2006

OTHER PUBLICATIONS

Supplementary European Search Report issued Aug. 30, 2011 in corresponding European Application No. 06 76 8017.

Engdegard et al., "Synthetic Ambiance in Parametric Stereo Coding", Audio Engineering Society, Convention Paper 6074, 116$^{th}$ Convention, May 1, 2004, XP040506819.

International Search Report issued Oct. 3, 2006 in the International (PCT) Application of which the present application is the U.S. National Stage.

ISO/IEC 14496-3: 2001 / FDAM 2: 2004(E) (International Organisation for Standardization, "Coding of Moving Pictures and Audio").

* cited by examiner

41(42, 43)

| Address | | Mixing coefficient |
|---|---|---|
| $q\theta$ | $qL$ | $h_{11}(h_{12}, h_{13})$ |
| AAA | BBB | CCC |
| ⋮ | ⋮ | ⋮ |

SIGNAL PROCESSING DEVICE

BACKGROUND OF THE INVENTION

1. Technical Field

The present invention relates to signal processing devices for decoding a coded signal that is generated by coding a downmixed signal of a plurality of signals and information for dividing the downmixed signal into the original signals. The present invention particularly relates to techniques of decoding a coded signal that is generated by coding a phase difference and a level ratio between signals to realize coding of multichannel realism with a small amount of information.

2. Background Art

A technique called a spatial codec (spatial coding) has been developed in recent years. This technique aims for compression coding of multichannel realism with a very small amount of information. For example, while AAC, which is a multichannel codec already widely used as a digital television audio format, requires a bit rate of 512 kbps or 384 kbps for 5.1 channels, the spatial codec is intended for compression coding of multichannel signals at a very low bit rate such as 128 kbps, 64 kbps, or even 48 kbps.

As a technique for achieving this aim, for instance, a technique disclosed in Parametric Coding for High Quality Audio (Non-patent Document 1) standardized in MPEG Audio has been put to use. Non-patent Document 1 describes a process of decoding a signal that is generated by coding a phase difference and a level ratio between channels so as to realize compression coding of realism with a small amount of information.

FIG. 1 is a diagram showing a process of a conventional signal processing device disclosed in Non-patent Document 1.

Input signal S is a result of downmixing original signals of 2 channels into a monaural signal. Input signal S is inputted to a processing module called decorrelation, as a result of which output signal D is obtained.

Though decorrelation is described in detail in section 8.6.4.5.2 "Calculate decorrelated signal" in Non-patent Document 1 and so its detailed explanation has been omitted here, decorrelation is roughly made up of two processes.

A first process is delaying. This is a process of delaying an input signal by a predetermined time period. The delayed signal is then subject to a second process called all pass filtering. All pass filtering is a process of decorrelating an input signal and also providing a reverberation component to the input signal.

Such generated signal D and input signal S are submitted for a process called mixing. Though this process too is described in detail in section 8.6.4.6.2 "Mixing" in Non-patent Document 1 and so its detailed explanation has been omitted here, two signals S and D are multiplied by coefficients h11, h12, h21, and h22 and multiplication results are added, as a result of which a L channel signal and a R channel signal are output. Expressions for this calculation are shown in the drawing.

Here, coefficients h11, h12, h21, and h22 are determined by level ratio L and phase difference θ between the original signals of 2 channels from which the input monaural signal is derived. According to a method currently under standardization in MPEG, coefficients h11, h12, h21, and h22 are obtained according to the following expressions.

Let θ be $$\theta = \arccos(r)$$

where r denotes a correlation between the original signals of 2 channels.

Also, let δ be $$\delta = \arctan((1-L)/(1+L)*\tan(\theta/2)).$$

Then $$h11 = L/(1+L*L)^{0.5}*\cos(\delta+\theta/2)$$

$$h21 = L/(1+L*L)^{0.5}*\sin(\delta+\theta/2)$$

$$h12 = 1/(1+L*L)^{0.5}*\cos(\delta-\theta/2)$$

$$h22 = 1/(1+L*L)^{0.5}*\sin(\delta-\theta/2).$$

The above expressions correspond to a method that has evolved from a mixing coefficient calculation method described in Non-patent Document 1. Which is to say, the above expressions correspond to a mixing coefficient calculation method in a spatial codec, which is currently under standardization in MPEG.

As a result of the above process, when generating signals of 2 channels from a monaural signal, the delay and the reverberation addition in decorrelation produce such an effect that provides a sense of spaciousness and delivers favorable stereo signals.

Non-patent Document 1: ISO/IEC 14496-3: 2001/FDAM 2: 2004(E)

However, the above method has the following problems.

In a case where the input signal has an extremely sharp time variation (such as an instant at which a metal percussion instrument is struck), due to the effect of the delay and reverberation addition in the decorrelation process, the decorrelated signal loses the sharpness of the input signal. Since this decorrelated signal and input signal S are added in the mixing process that follows the decorrelation process, the resulting output signals will end up losing the sharpness of the input signal.

Likewise, in a case where frequency components of the input signal unevenly concentrate in a specific frequency band (such as when a timbre of one type of instrument continues), although a sound image of highly precise localization must be created, the effect of the delay and reverberation addition in the decorrelation process causes the sound image of precise localization to be blurred in the decorrelated signal. Since this decorrelated signal and input signal S are added in the mixing process that follows the decorrelation process, the resulting output signals will end up having a blurred sound image.

Also, the decorrelation process is structured by a filter with a large number of taps in order to add a reverberation component. This requires an extremely large amount of computation.

Furthermore, the process of obtaining coefficients h11, h12, h21, and h22 from the information about the level ratio and the phase difference involves making a complex correlation between a plurality of trigonometric functions that are arc cos( ), arc tan( ), tan( ), sin( ), and cos( ), as mentioned above. This requires a significantly large amount of computation, too.

The present invention was conceived in view of the above conventional problems. A first object of the present invention is to provide a signal processing device that can, when generating signals of 2 channels from a monaural signal, realize sharpness of a time variation of a sound and precise localization of a sound image, while providing a sense of spaciousness and producing favorable stereo signals.

A second object of the present invention is to reduce the amount of computation for the decorrelation process.

A third object of the present invention is to reduce the amount of computation for the process of obtaining coefficients h11, h12, h21, and h22.

SUMMARY OF THE INVENTION

To achieve the first object, the signal processing device according to the present invention is a signal processing device including: a generation unit which generates a second signal from a first signal that is obtained by downmixing two signals; a mixing coefficient determination unit which determines, based on a value L and a value θ, a mixing degree for mixing the first signal and the second signal, the value L indicating a level ratio between the two signals, and the value θ indicating a phase difference between the two signals; and a mixing unit which mixes the first signal and the second signal based on the mixing degree determined by the mixing coefficient determination unit, wherein the generation unit includes: a first filter unit which generates a low frequency band signal in the second signal, from a low frequency band signal in the first signal; and a second filter unit which generates a high frequency band signal in the second signal, from a high frequency band signal in the first signal, the first filter unit, for a complex-number signal, decorrelates an input signal and adds a reverberation component by using a delay unit and an all pass filter, and the second filter unit is different from the first filter unit.

According to this structure, an amount of processing required by the second filter unit can be made smaller than an amount of processing required by the first filter unit, and also spaciousness provided by the second filter unit can be made less than spaciousness provided by the first filter unit. As a result, when generating signals of 2 channels from a monaural signal, sharpness of a time variation of a sound and precise localization of a sound image can be realized, while producing favorable stereo signals with a sense of spaciousness in a low frequency band.

Moreover, to achieve the second object, in the signal processing device according to the present invention, the second filter unit may be an all pass filter for a real-number signal.

According to this structure, when generating signals of 2 channels from a monaural signal, high frequency band signal processing is simplified. Therefore, sharpness of a time variation of a sound and precise localization of a sound image can be realized and also an amount of computation can be reduced, while producing favorable stereo signals with a sense of spaciousness.

Moreover, to achieve the second object, in the signal processing device according to the present invention, the second filter unit may be an orthogonal rotation filter which rotates a phase by 90 degrees or −90 degrees.

According to this structure, when generating signals of 2 channels from a monaural signal, sharpness of a time variation of a sound and precise localization of a sound image can be realized and also an amount of computation can be reduced, while producing favorable stereo signals with a sense of spaciousness.

Moreover, to achieve the third object, in the signal processing device according to the present invention, the mixing coefficient determination unit may obtain four mixing coefficients h11, h12, h21, and h22, wherein when, in a parallelogram where an angle formed by two adjacent sides is the value θ and a ratio in length of the two adjacent sides is the value L, angles obtained by dividing the angle θ by a diagonal of the parallelogram are denoted by A and B, and values determined according to the level ratio L are denoted by d1 and d2, the mixing coefficient determination unit: obtains the mixing coefficient h11 as d1*cos(A); obtains the mixing coefficient h12 as d2*cos(B); obtains the mixing coefficient h21 as d1*sin(A) or d2*sin(B); and obtains the mixing coefficient h22 as −h21.

According to this structure, the four mixing coefficients can be obtained by calculating only the three mixing coefficients.

Moreover, to achieve the third object, in the signal processing device according to the present invention, when a quantized value indicating the value θ is denoted by qθ and a quantized value indicating the value L is denoted by qL, the mixing coefficient determination unit may: receive the quantized value qθ and the quantized value qL, and convert the received quantized value qθ and quantized value qL to a value r and the value L respectively, the value r representing cos θ; and obtain the mixing coefficients h11, h12, h21, and h22 according to $$h11=d1*(L+r)/((1+L^2+2*L*r)^{0.5})$$

$$h12=d2*(1+L*r)/((1+L^2+2*L*r)^{0.5})$$

$$h21=d1*(1-r^2)^{0.5}/((1+L^2+2*L*r)^{0.5})$$

$$h22=-h21.$$

According to this structure, when calculating the mixing coefficients, trigonometric function processing is unnecessary.

Moreover, to achieve the third object, in the signal processing device according to the present invention, when a quantized value indicating the value θ is denoted by qθ and a quantized value indicating the value L is denoted by qL, the mixing coefficient determination unit may include a table that has the quantized value qθ and the quantized value qL as addresses, and: obtain the mixing coefficients h11, h12, and h21, using the table; and obtain the mixing coefficient h22 according to h22=−h21.

According to this structure, the four mixing coefficients can be obtained by table referencing. Furthermore, this requires only three tables.

Moreover, to achieve the third object, in the signal processing device according to the present invention, the mixing coefficient determination unit may obtain four mixing coefficients h11, h12, h21, and h22, wherein when a real part and an imaginary part of the first signal expressed by a complex number are respectively denoted by r1 and i1, and a real part and an imaginary part of the second signal expressed by a complex number are respectively denoted by r2 and i2, the mixing unit: sets h11*r1+h21*r2 as a real part of a first output signal; sets h11*i1+h21*i2 as an imaginary part of the first output signal; sets h12*r1+h22*r2 as a real part of a second output signal; and sets h12*i1+h22*i2 as an imaginary part of the second output signal.

According to this structure, complex-number signal processing can be performed by the mixing unit.

Moreover, to achieve the third object, in the signal processing device according to the present invention, the mixing coefficient determination unit may obtain four mixing coefficients h11, h12, h21, and h22, wherein when a value of the first signal expressed by a real number is denoted by r1 and a value of the second signal expressed by a real number is denoted by r2, the mixing unit: sets h11*r1+h21*r2 as a first output signal; and sets h12*r1+h22*r2 as a second output signal.

According to this structure, real-number signal processing can be performed by the mixing unit.

It should be noted that the present invention can be realized not only by the above signal processing device. The present invention can also be realized by a signal processing method that includes steps corresponding to the characteristic units included in the above signal processing device, or by a program for having a computer execute these steps. Such a program can be distributed via a recording medium such as a CD-ROM or a transfer medium such as an internet. Furthermore, the present invention can be realized as an LSI that integrates the characteristic units included in the above signal processing device.

As is clear from the above description, when generating signals of 2 channels from a monaural signal, the signal processing device according to the present invention can realize sharpness of a time variation of a sound and precise localization of a sound image, provide a sense of spaciousness in a low frequency band, and produce favorable stereo signals.

Of course, by connecting the process of the present invention that generates signals of 2 channels from a monaural signal in a plurality of stages, favorable multichannel signals (for example, 5.1 channels) can be produced from a monaural signal. Likewise, favorable multichannel signals (for example, 5.1 channels) can be produced from signals of 2 channels.

Therefore, the present invention has a very high practical value, as distribution of music content to mobile phones and portable information terminals and viewing of such music content have become widespread today.

NUMERICAL REFERENCES

Figure 1:
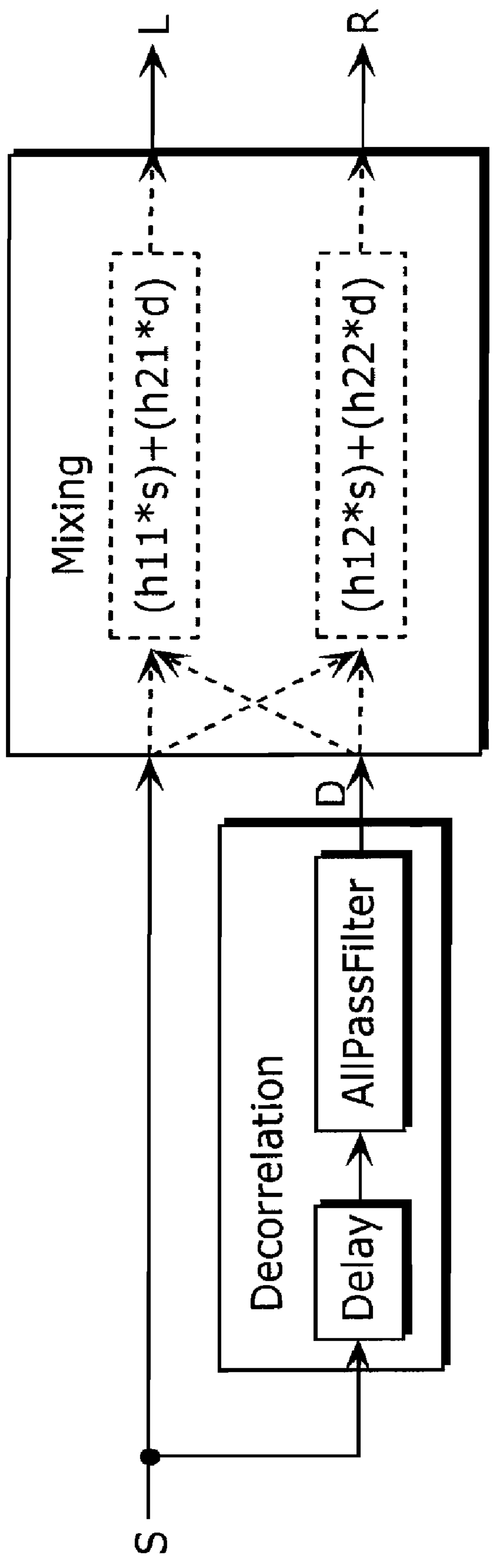
FIG. 1 (PRIOR ART)
FIG. 1 shows a basic structure of a conventional technique.

1, 2, 3 signal processing device
10 decoding unit
20 feature quantity detection unit
21 feature quantity reception unit
30, 31, 32 generation unit
40 mixing coefficient determination unit
41, 42, 43 table
50 mixing unit
301 delay unit
302 first filter
303 second filter
304 synthesis unit
305 second delay unit
306 third filter
307 processing unit

DETAILED DESCRIPTION OF THE INVENTION

The following describes a signal processing device according to a first embodiment of the present invention, with reference to drawings.

(First Embodiment)

Figure 2:
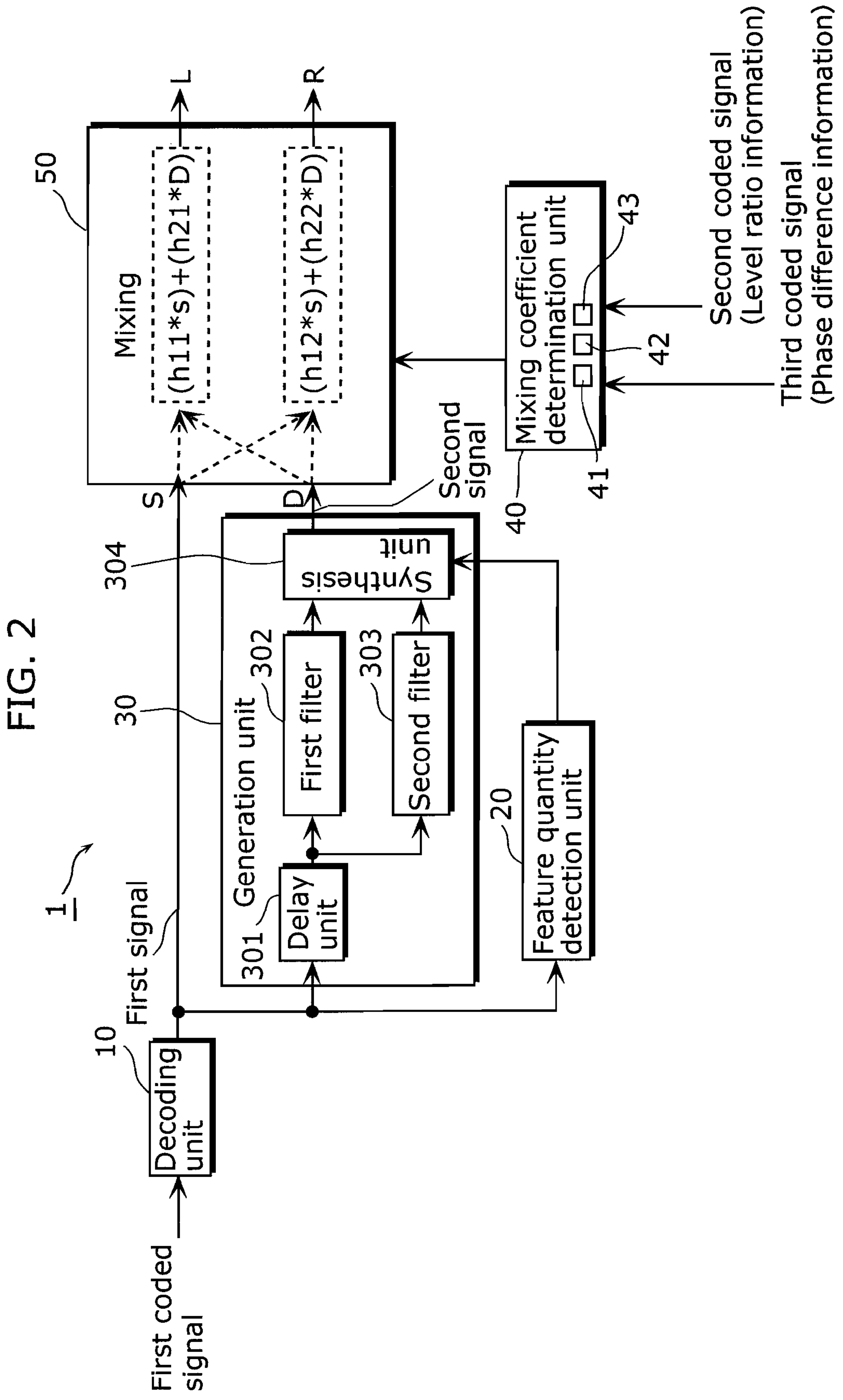
FIG. 2 shows a structure of a signal processing device according to a first embodiment of the present invention.

FIG. 2 is a functional block diagram showing a structure of the signal processing device according to the first embodiment. It should be noted that a decoding unit 10 is shown in the drawing too.

A signal processing device 1 is a device for decoding a bit stream that includes: a first coded signal generated by coding a downmixed signal of two audio signals; a second coded signal which is level ratio information generated by coding a value determined in accordance with level ratio L between the two audio signals; and a third coded signal which is phase difference information generated by coding a value determined in accordance with phase difference θ between the two audio signals. As shown in FIG. 2, the signal processing device 1 includes a feature quantity detection unit 20, a generation unit 30, a mixing coefficient determination unit 40, and a mixing unit 50.

The generation unit 30 includes a delay unit 301, a first filter 302, a second filter 303, and a synthesis unit 304. The mixing coefficient determination unit 40 includes three tables 41, 42, and 43 respectively for obtaining mixing coefficients h11, h12, and h2 from the level ratio information and the phase difference information.

The decoding unit 10 decodes the first coded signal to generate a first signal. The generation unit 30 generates a second signal from the first signal. The mixing coefficient determination unit 40 determines mixing coefficients from the second coded signal and the third coded signal. The mixing unit 50 mixes the first signal and the second signal based on a mixing degree determined by the mixing coefficient determination unit 40. The delay unit 301 delays the first signal by unit time N (N>0). The first filter 302 processes an output signal of the delay unit 301. The second filter 303 processes the output signal of the delay unit 301. The feature quantity detection unit 20 detects an acoustic feature quantity of the first signal. The synthesis unit 304 synthesizes the second signal from an output signal of the first filter 302 and an output signal of the second filter 303, according to the acoustic feature quantity.

The following describes an operation of the signal processing device having the above structure. Firstly, a spatial codec applied by the signal processing device 1 in this application is described below, using an example of 2 channels L and R.

Figure 3:
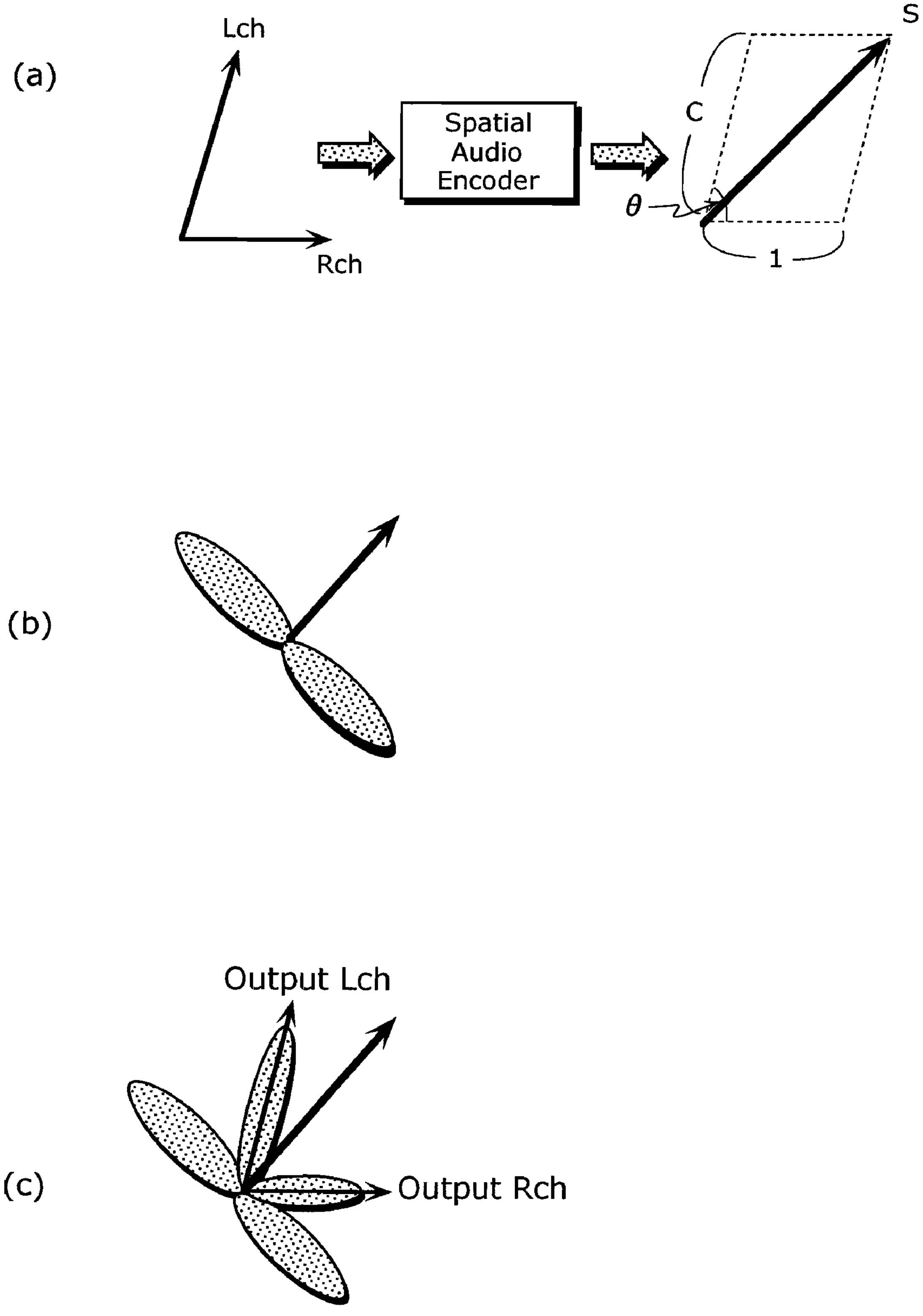
FIG. 3 is a diagram for explaining a spatial codec applied by a signal processing device 1.

In an encoding process, a spatial audio encoder obtains downmixed signal S, level ratio c, and phase difference θ from music signals of 2 channels L and R through a complex-number operation, as shown in FIG. 3(*a*). Downmixed signal S is further coded by an MPEG AAC coding device. Level ratio c is coded as the second coded signal. Phase difference θ is converted to, for example, r (r=cos(θ)), and this r is coded as the third coded signal.

In a decoding process, the generation unit 30 generates decorrelated signal D that is orthogonal to downmixed signal S and is accompanied by reverberation as shown in FIG. 3(*b*), with a smaller amount of computation than in conventional techniques.

The mixing unit 50 mixes downmixed signal S and decorrelated signal D based on the mixing coefficients determined by the mixing coefficient determination unit 40, to generate 2 channels L and R with a smaller amount of computation than in conventional techniques.

In more detail, firstly the decoding unit 10 decodes the first coded signal to generate the first signal. Here, the first coded signal is a result of coding a monaural signal which is obtained by downmixing the two audio signals. For example, the monaural signal has been coded by an MPEG AAC encoder. It is assumed here that the decoding unit 10 performs up to converting a PCM signal, which is obtained by decoding such an AAC coded signal, to a frequency signal made up of a plurality of frequency bands. The following description relates to a process performed on a signal of one specific frequency band, in the signal of the plurality of frequency bands.

The generation unit 30 generates the second signal from the first signal, in the following manner. In the generation unit 30, firstly the delay unit 301 delays the first signal by unit time N (N>0). Next, the first filter 302 applies filtering to an output signal of the delay unit 301. As one example, the first filter 302 performs all pass filtering whose order is P. All pass filtering has an effect of decorrelating an input signal and also adding a reverberation component. All pass filtering may be performed according to any conventionally known method. For instance, an all pass filter described in section 8.6.4.5.2 in aforementioned Non-patent Document 1 is applicable.

Meanwhile, the second filter 303 applies all pass filtering whose order is smaller than P, to the output signal of the delay unit 301.

Alternatively, the second filter 303 may perform a process of rotating a phase by 90 degrees, instead of the delay unit 301 and the all pass filter. This process of rotating a phase by 90 degrees enables an input signal to be decorrelated without being accompanied by any reverberation component that is generated in all pass filtering. Hence this process is very useful when eliminating a reverberation component.

Such generated output signal of the first filter 302 and output signal of the second filter 303 are then processed by the synthesis unit 304, as a result of which the second signal is generated. This process is performed as follows. The feature quantity detection unit 20 detects the acoustic feature quantity of the first signal, and determines a ratio of mixing the output signal of the first filter 302 and the output signal of the second filter 303 in accordance with the acoustic feature quantity.

For example, the acoustic feature quantity is a feature quantity that is large when the first signal varies sharply. When the acoustic feature quantity is small, the synthesis unit 304 may output only the output signal of the first filter 302, or mix the output signal of the first filter 302 more than the output signal of the second filter 303 and output the mixture. When the acoustic feature quantity is large, on the other hand, the synthesis unit 304 may output only the output signal of the second filter 303, or mix the output signal of the second filter 303 more than the output signal of the first filter 302 and output the mixture.

Alternatively, the acoustic feature quantity may be a feature quantity that is large when the first signal has strong energy concentrating in a specific frequency band. Also, the acoustic feature quantity may be a combination of the above feature quantities.

An important point here is that the acoustic feature quantity represents sharpness of a time variation of a sound or precise localization of a sound image. The first filter 302 is an all pass filter whose order is P, which adds reverberation to a sound. When such reverberation is unwanted, that is, when sharpness of a time variation of a sound or precise localization of a sound image is required, it is necessary to reduce reverberation by decreasing the order of the all pass filter.

The second signal generated by the generation unit 30 in the above manner is then mixed with the first signal in the mixing unit 50. This operation is described below.

Firstly, the mixing coefficient determination unit 40 determines the mixing coefficients from the second coded signal and the third coded signal. The second coded signal is a result of coding a value that is determined according to level ratio L between the original two audio signals. The third coded signal is a result of coding a value that is determined according to phase difference θ between the original two audio signals. A method of obtaining mixing coefficients h11, h12, h21, and h22 from these level ratio information and phase difference information is the following.

Figures 4, 5:
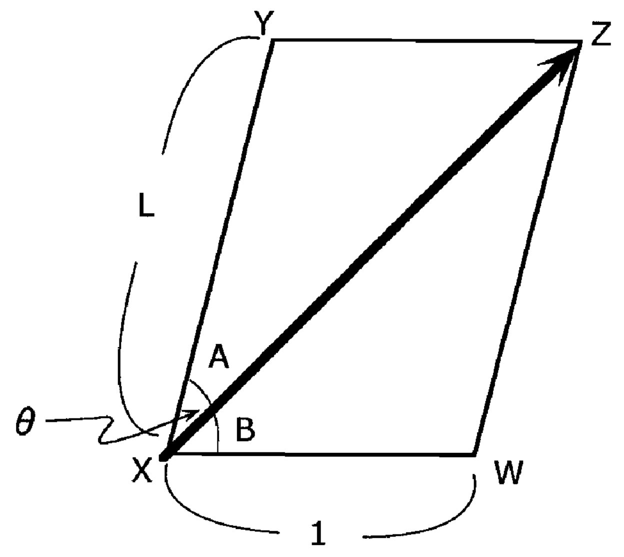
FIG. 4 is a diagram for explaining level ratio information and phase difference information using a parallelogram.
FIG. 5 shows an example structure of a table 41 shown in FIG. 2.

Consider a parallelogram in which an angle formed by two adjacent sides is θ and a ratio in length of the two adjacent sides is L. When A and B denote angles obtained by dividing θ by a diagonal of the parallelogram, and d1 and d2 denote values determined according to level ratio L, h11=d1*cos(A), h21=d1*sin(A), h12=d2*cos(−B), and h22=d2*sin(−B). In these expressions, d1 and d2 are respectively d1=L/((1+2*L*cos(θ)+L*L)^0.5) and d2=1/((1+2*L*cos(θ)+L*L)^0.5). This enables the downmixed monaural signal to be divided into the original two signals with mathematical accuracy, in accordance with the phase difference and level ratio of the original two signals. A reason for this is shown in FIG. 4. In parallelogram XYZW where an angle formed by two adjacent sides is θ and a ratio in length of the two adjacent sides is L, A and B are respectively angles YXZ and WXZ obtained by dividing angle θ by a diagonal of parallelogram XYZW. Length XZ of the diagonal is mathematically calculated as ((1+2*L*cos(θ)+L*L)^0.5. Based on this property, d1 and d2 are respectively d1=L/((1+2*L*cos(θ)+L*L)^0.5) and d2=1/((1+2*L*cos(θ)+L*L)^0.5).

Though the above describes the case where d1 and d2 are respectively $$d1=L/((1+2*L*\cos(\theta)+L*L)\hat{}0.5)$$

$$d2=1/((1+2*L*\cos(\theta)+L*L)\hat{}0.5)$$

there is also a case where d1 and d2 are respectively $$d1=L/((1+L*L)\hat{}0.5)$$

$$d2=1/((1+L*L)\hat{}0.5).$$

This is the case where, when downmixing the original two signals, the downmixed signal is corrected in size in accordance with phase difference θ.

For instance, when phase difference θ of the original two signals is 90 degrees, the size of the downmixed signal is not corrected. However, when phase difference θ of the original two signals is smaller than 90 degrees, the downmixed signal is corrected to be smaller in size.

This is because the size of the downmixed signal is relatively larger in the case where the phase difference of input signals is below 90 degrees than in the case where the phase difference of the input signals is 90 degrees, even when a size of the input signals is the same in absolute value in both of the cases.

On the other hand, when phase difference θ of the original two signals is larger than 90 degrees, the downmixed signal is corrected to be larger in size. This is because the size of the downmixed signal is relatively smaller in the case where the phase difference of the input signals exceeds 90 degrees than in the case where the phase difference of the input signals is 90 degrees, even when the size of the input signals is the same in absolute value in both of the cases.

Therefore, in the case where the size of the downmixed signal is corrected in accordance with the value of cos(θ), d1 and d2 are set not to $$d1=L/((1+2*L*\cos(\theta)+L*L)\hat{}0.5)$$

$$d2=1/((1+2*L*\cos(\theta)+L*L)\hat{}0.5)$$

but to $$d1=L/((1+L*L)\hat{}0.5$$

$$d2=1/((1+L*L)\hat{}0.5).$$

Meanwhile, cos(A), sin(A), cos(B), and sin(B) are calculated according to $$\cos(A)=(L+\cos\theta)/((1+L^2+2L\cos\theta)^{0.5})$$

$$\sin(A)=\sin\theta/((1+L^2+2*L*\cos\theta)^{0.5})$$

$$\cos(B)=(1+L\cos\theta)/((1+L^2+2L\cos\theta)^{0.5})$$

$$\sin(B)=(L*\sin\theta)/((1+L^2+2*L*\cos\theta)^{0.5})$$

based on a mathematical property of a parallelogram.

In this embodiment, the third coded signal is a signal obtained by coding a value that is determined according to phase difference θ between the original two audio signals. In many cases, however, the third coded signal is a signal that shows correlation r between the original two audio signals.

For example, Non-patent Document 1 and the spatial codec which is currently under standardization in MPEG both belong to these cases. Correlation r can be regarded as cos(θ).

A reason for this is given below. In a case where correlation r of the two signals is 1 as an example, phase difference θ is 0. In this case, cos(θ)=1. Hence correlation r represents cos(θ). Also, in a case where correlation r of the two signals is 0 as an example, phase difference θ is 90 degrees. In this case, cos(θ)=0. Hence correlation r represents cos(θ). Furthermore, in a case where correlation r of the two signals is −1 as an example, phase difference θ is 180 degrees. In this case, cos(θ)=−1. Hence correlation r represents cos(θ).

From this logic, it can be understood that correlation r can be regarded as cos(θ). Therefore, from the above expressions, cos(A), cos(B), sin(A), and sin(B) can be calculated according to $$\cos(A)=(L+r)/((1+L^2+2*L*r)^{0.5})$$

$$\cos(B)=(1+L*r)/((1+L^2+2*L*r)^{0.5})$$

$$\sin(A)=(1-r^2)^{0.5}/((1+L^2+2*L*r)^{0.5})$$

$$\sin(B)=(L*(1-r^2)^{0.5})/((1+L^2+2*L*r)^{0.5}).$$

Since there is no trigonometric function on the right-hand side of any of these expressions, the calculation can be eased greatly.

Mixing coefficients h11, h21, h12, and h22 to be obtained are $$h11=d1*\cos(A)$$

$$h21=d1*\sin(A)$$

$$h12=d2*\cos(-B)$$

$$h22=d2*\sin(-B).$$

As is clear from the above relationship of d1 and d2, h22=−h21. Therefore, h22 can be obtained just by inverting a sign of h21.

Also, since the above d1, d2, cos(A), sin(A), cos(B), and sin(B) can all be obtained using L and r, h11, h21, h12, and h22 can be obtained using Land r, too. Accordingly, h11, h21, h12, and h22 can be obtained by storing d1*cos(A), d1*sin(A), d2*cos(−B), and d2*sin(−B) which have been calculated beforehand, in tables having L and r as indexes.

In this embodiment, L and r are coded or quantized as the second coded signal and the third coded signal, respectively. This being so, the tables can be referenced with such coded values or quantized values themselves as indexes.

Here, a table regarding h22 is of course unnecessary, since h22 can be easily obtained from the relationship h22=−h21. This is the reason why the mixing coefficient determination unit 40 has only three tables in FIG. 2 (or FIG. 8 in a second embodiment).

For instance, the table 41 (42, 43) may be structured to obtain mixing coefficient h11 (h12, h21) using qθ and qL as addresses, as shown in FIG. 5.

Though the above describes the case where the calculation and the table for h22 are unnecessary, it should be obvious that h22 may be obtained through the calculation and the table, while making the calculation and the table for h21 unnecessary.

By using such generated mixing coefficients h11, h21, h12, and h22, the first signal and the second signal are mixed in the mixing unit 50. This is done in the following manner.

Let r1 and i1 be a real part and an imaginary part of the first signal expressed by a complex number, respectively. Also, let r2 and i2 be a real part and an imaginary part of the second signal expressed by a complex number, respectively. This being the case, h11*r1+h21*r2 is a real part of a first output signal, h11*i1+h21*i2 is an imaginary part of the first output signal, h12*r1+h22*r2 is a real part of a second output signal, and h12*i1+h22*i2 is an imaginary part of the second output signal.

The second signal is the decorrelated signal. Since the decorrelation process requires a large amount of computation, real-number processing may be performed instead of complex-number processing for a reduction in computation amount. In such a case, h11*r1+h21*r2 is the first output signal, and h12 *r1+h22*r2 is the second output signal.

As described above, according to this embodiment, a signal processing device for generating two signals by mixing a first signal and a second signal generated from the first signal based on two mixing degrees (two cases that are the case of mixing by the combination of h11 and h21, and the case of mixing by the combination of h12 and h22) includes: a generation unit which generates the second signal from the first signal; a mixing coefficient determination unit which determines the mixing degrees; and a mixing unit which mixes the first signal and the second signal based on the mixing degrees determined by the mixing coefficient determination unit. Here, the generation unit includes: a delay unit which delays the first signal by unit time N (N>0); a complex-number all pass filter which processes an output signal of the delay unit; and a second filter unit which is not a complex-number all pass filter. The second filter unit generates a signal that has less sound spaciousness and reverberation than a signal generated by the delay unit and the complex-number all pass filter. When the first signal is such a signal that varies sharply or that has strong energy concentrating in a specific frequency band, an output signal of a processing unit is mixed more in the second signal. As a result, when generating signals of 2 channels from a monaural signal, sharpness of a time variation of a sound and precise localization of a sound image can be realized, while providing spaciousness and producing favorable stereo signals.

Also, by having the second filter unit perform a process of rotating a phase of an input by 90 degrees or −90 degrees, a reverberation component can be reduced greatly, and a signal that is uncorrelated with the input can be generated with a very small amount of computation.

Also, by structuring the second filter unit as a real-number all pass filter, reverberation can be provided to a sound source that requires reverberation, while reducing an amount of computation.

Also, by obtaining mixing coefficients h11, h21, h12, and h22 according to $$h11=d1*(L+r)/((1+L^2+2*L*r)^{0.5})$$

$$h12=d2*(1+L*r)/((1+L^2+2*L*r)^{0.5})$$

$$h21=d1*(1-r^2)^{0.5}/((1+L^2+2*L*r)^{0.5})$$

$$h22=-h21$$

it becomes unnecessary to perform any complex trigonometric function processing. This contributes to significant reductions in computation amount and memory.

Also, since h11, h12, h21, and h22 are all obtained using only the phase difference information and the level ratio information that are presented as quantized coded signals, h11, h12, h21, and h22 can be obtained easily by storing h11, h12, h21, and h22 which have been calculated beforehand, in tables having such quantized values (integers) themselves as indexes. Here, h22 can be obtained as −h21, so that a table for h22 can of course be omitted.

Figure 6:
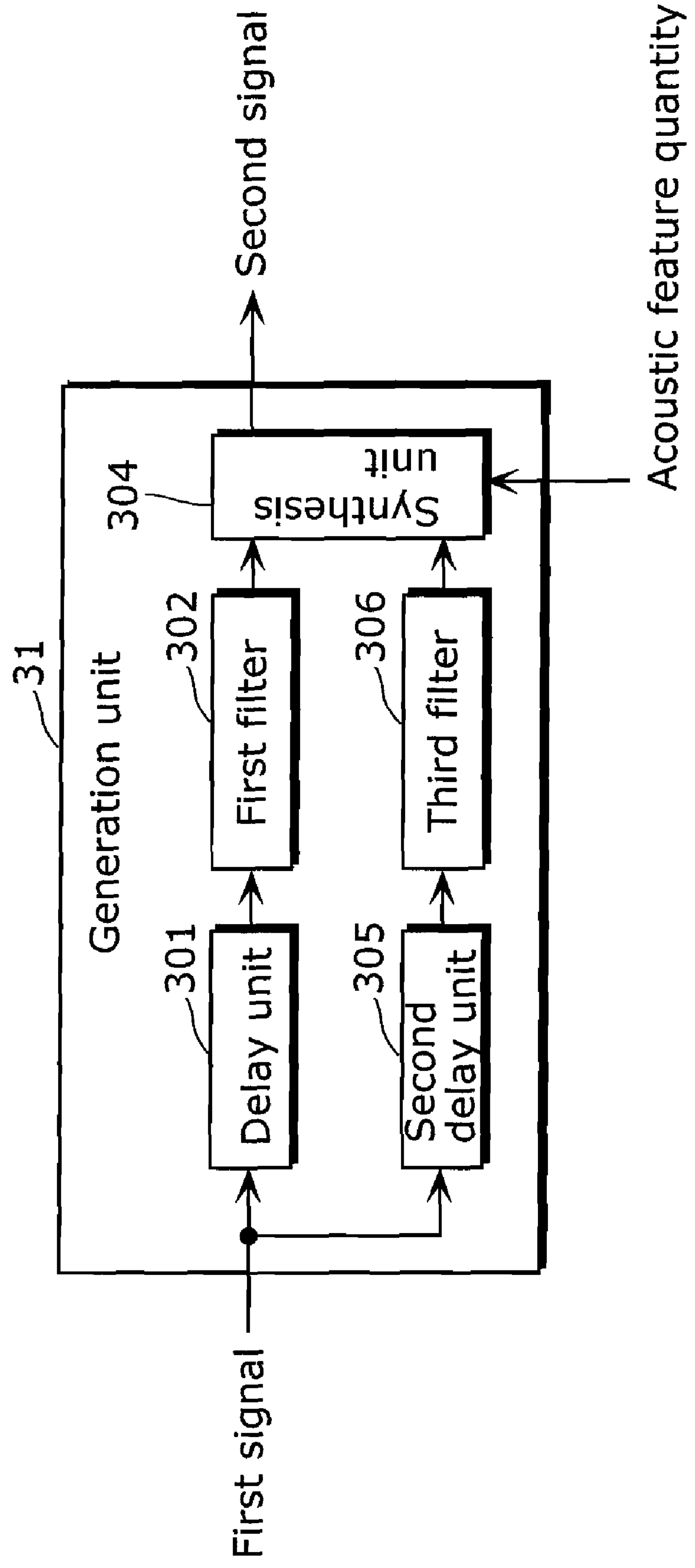
FIG. 6 is a block diagram showing another structure example of a generation unit.

Note that, from the viewpoint that reverberation is reduced by decreasing the order of the all pass filter when sharpness of a time variation of a sound or precise localization of a sound image is required, a structure of a generation unit 31 shown in FIG. 6 may be employed in place of the generation unit 30. Here, structural parts of the generation unit 31 that correspond to those of the generation unit 30 have been given the same numerals and their detailed explanation has been omitted.

The generation unit 31 includes a delay unit 305 and a third filter 306, in addition to the delay unit 301, the first filter 302, and the synthesis unit 304.

In the generation unit 30 shown in FIG. 2, first signal S outputted from the decoding unit 10 is processed by the delay unit 301 and the second filter 303. In the generation unit 31 shown in FIG. 6, on the other hand, first signal S outputted from the decoding unit 10 is processed by the delay unit 305 and the third filter 306.

The second delay unit 305 delays the first signal by unit time n ($N>n\geqq0$). The third filter 306 rotates a phase of an input signal by 90 degrees or −90 degrees.

The delay unit 301 and the first filter 302 have an effect of providing sound spaciousness and reverberation. When such spaciousness and reverberation are unwanted, that is, when sharpness of a time variation of a sound or precise localization of a sound image are required, it is necessary to reduce an amount of delay and an amount of reverberation.

In such a case, the second delay unit 305 that has a smaller amount of delay than the delay unit 301 and the third filter that provides less reverberation are employed. Here, the amount of delay of the second delay unit 305 may be 0. In other words, the second delay unit 305 may be omitted. The third filter 306 rotates a phase of an input signal by 90 degrees or −90 degrees. This enables a signal that has no correlation with the input signal and no delay, to be generated with a very small amount of computation. Therefore, the third filter 306 is highly useful as a means for generating a sharp signal that is uncorrelated with an input signal.

Here, it is of particular importance that the generated signal is uncorrelated with the input signal (the first signal). If the generated signal has a high correlation with the first signal, a mere monaural sound (a non-stereophonic sound) will end up being produced as a result of the mixing with the first signal in the mixing unit 50 that follows the generation unit 31.

An output signal of the filter 302 and the third filter 306 obtained in the above manner are then synthesized in the synthesis unit 304 in accordance with the acoustic feature quantity. This can be performed using the same method as described above.

In this way, a sharp sound with precise localization can be produced when sound spaciousness and reverberation are unwanted.

Though this embodiment describes the case where the acoustic feature quantity is detected by the feature quantity detection unit 20, this is not a limit for the present invention. Data generated by coding the acoustic feature quantity in advance may be received.

Figure 7:
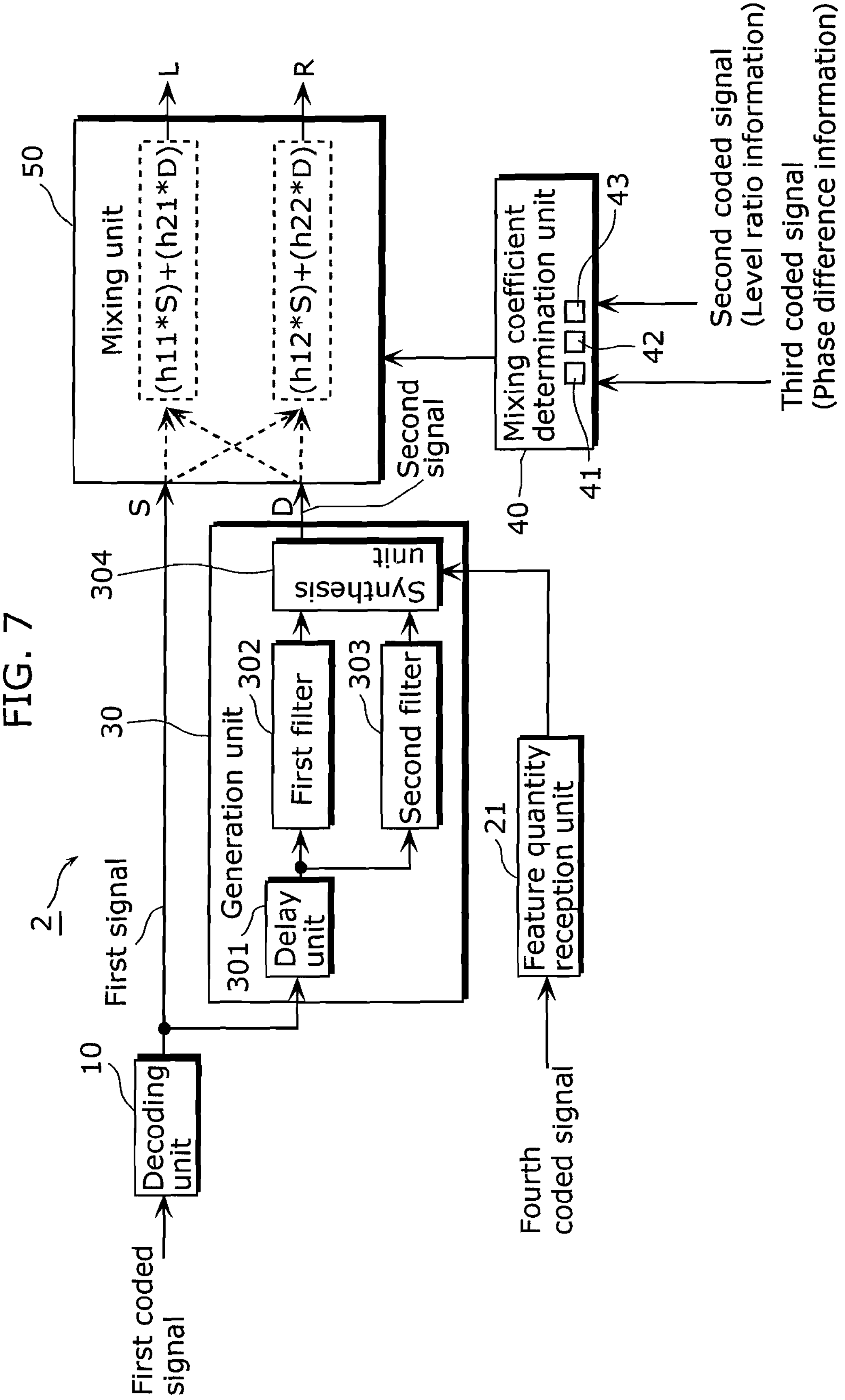
FIG. 7 shows another structure of a signal processing device according to an embodiment of receiving coded data which shows an acoustic feature quantity.

FIG. 7 shows a structure in such a case. The only difference between FIGS. 2 and 7 is that a feature quantity reception unit 21 is included instead of the feature quantity detection unit 20. The feature quantity reception unit 21 receives data generated by coding the acoustic feature quantity of the input signal, as a fourth coded signal. For example, the fourth coded signal is such a coded signal that is true when strong energy concentrates in a specific frequency band and false otherwise. When the fourth coded signal is true, the generation unit 30 generates a signal with small reverberation (that is, a signal generated as a result of a signal, which has a small amount of delay or no delay, being processed by a filter with a short tap length or being rotated in phase by 90 degrees). When the fourth coded signal is false, the generation unit 30 generates a signal with large reverberation (that is, a signal generated as a result of a signal, which has a large amount of delay, being processed by a filter with a long tap length). In this way, processing can be performed as intended by an encoder side, with it being possible to generate signals of a high sound quality. In this case, the synthesis unit 304 can be realized simply by a selector function.

(Second Embodiment)

The following describes a signal processing device 3 according to the second embodiment of the present invention, with reference to drawings.

A main difference of the second embodiment from the first embodiment lies in the following. In the first embodiment, a method of generating a second signal is adapted in accordance with each signal that is inputted successively. In the second embodiment, on the other hand, considering that a low frequency band signal greatly contributes to sound reverberation and spaciousness whereas a high frequency band signal does not much contribute to sound reverberation and spaciousness, a generation unit is changed between a low frequency band and a high frequency band in order to reduce an amount of computation.

Figure 8:
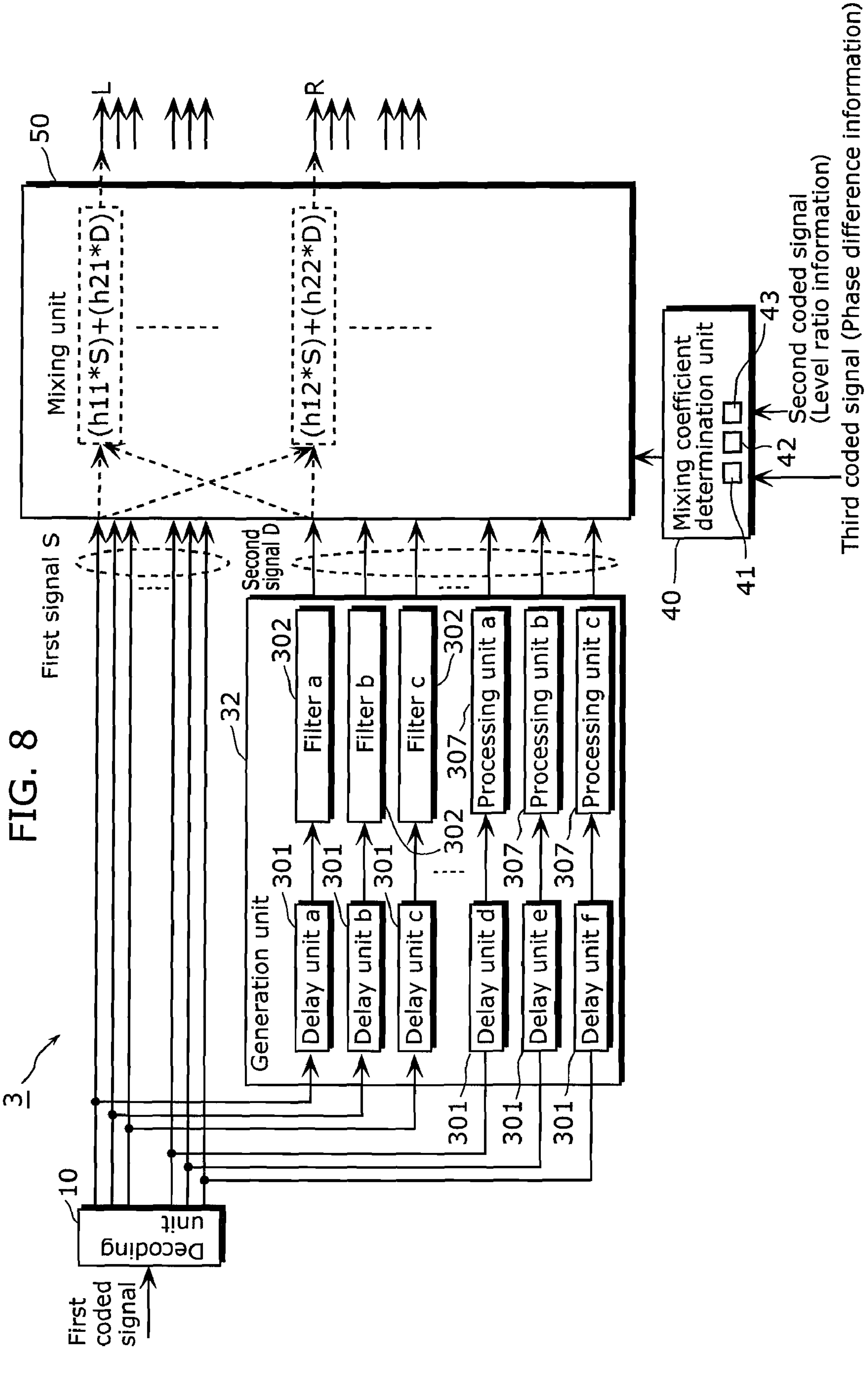
FIG. 8 shows a structure of a signal processing device according to a second embodiment of the present invention.

FIG. 8 shows a structure of the signal processing device according to the second embodiment of the present invention. Note here that structural parts corresponding to those of the signal processing devices 1 and 2 have been given the same numerals and their detailed explanation has been omitted.

The signal processing device 3 is a signal processing device for decoding a bit stream including: a first coded signal generated by coding a downmixed signal of two audio signals; a second coded signal generated by coding a value determined in accordance with level ratio L between the two audio signals; and a third coded signal generated by coding a value determined in accordance with phase difference θ between the two audio signals. As shown in FIG. 8, the signal processing device 3 includes a generation unit 32 which generates a second signal from a first signal, the mixing coefficient determination unit 40, and the mixing unit 50.

Here, the first signal is a frequency signal made up of a plurality of frequency bands. The generation unit 32 generates the second signal by processing a signal of each frequency band independently, as shown in FIG. 8. For example, the generation unit 32 may be structured to process a signal of a low frequency band (0 to 2 or 3 kHz as one example) by a delay unit 301 and a first filter 302, and a signal of a high frequency band (2 or 3 to 20 kHz as one example) by only a processing unit 307 which is formed by a filter and the like.

An amount of delay of a low frequency band signal may be equal to or larger than that of a higher frequency band signal. Also, a filter order of the first filter 302 corresponding to a low frequency band signal may be equal to or larger than that corresponding to a higher frequency band signal (the processing unit 307). Further, a filter unit (the processing unit 307) of a frequency band higher than a predetermined frequency band may perform a process of rotating an input signal by 90 degrees or −90 degrees. Moreover, the first filter 302 for a low frequency band signal and the filter unit (the processing unit 307) for a high frequency band signal may be structured such that the first filter 302 processes the signal by the delay unit 301 and a complex-number all pass filter whereas the processing unit 307 processes the signal by a delay unit and a real-number all pass filter.

An operation of the signal processing device 3 having the above structure is described below.

Firstly, the decoding unit 10 decodes the first coded signal to generate the first signal. Here, the first coded signal is a result of coding a monaural signal which is obtained by downmixing the two audio signals. For example, the monaural signal has been coded by an MPEG AAC encoder. It is assumed here that the decoding unit 10 performs up to converting a PCM signal, which is obtained by decoding such an AAC coded signal, to a frequency signal made up of a plurality of frequency bands.

The generation unit 32 generates the second signal from the first signal, in the following manner. Regarding a low frequency band (0 to 2 or 3 kHz as one example) among the plurality of frequency bands of the first signal, the generation unit 32 delays the signal by predetermined unit time N, and applies complex-number all pass filtering whose order is P, to the delayed signal. This all pass filtering may be performed using any conventionally known method. For instance, an all pass filter described in section 8.6.4.5.2 in aforementioned Non-patent Document 1 is applicable.

Regarding a frequency band (2 or 3 to 20 kHz as one example) higher than the above frequency band, the generation unit 32 delays the signal by unit time n that is equal to or smaller than N ($N \geqq n \geqq 0$), and applies all pass filtering whose order is p that is equal to or smaller than P ($P \geqq p \geqq 0$), to the delayed signal. Here, the generation unit 32 may perform a process of rotating the input signal by 90 degrees or −90 degrees, instead of all pass filtering. As an alternative, the generation unit 32 may perform real-number all pass filtering.

Which is to say, a lower frequency band signal is processed by a larger amount of delay and a complex-number filter of a larger number of taps so as to provide more sound spaciousness and reverberation, while a higher frequency band signal is processed by a smaller amount of delay and a complex-number filter of a smaller number of taps or a real-number filter.

A reason for this is given below. In general, a low frequency band signal greatly contributes to sound reverberation and spaciousness and has a significant influence on generation of a sound field. Accordingly, the low frequency band signal is processed with a sufficient amount of computation. Meanwhile, a high frequency component does not much contribute to reverberation and spaciousness, and so its processing is simplified for a reduction in computation amount.

Another reason is that, in general, a low frequency band signal greatly contributes to sound reverberation and spaciousness whereas a high frequency band signal greatly contributes to sound sharpness. Of course, in view of a result of precise analysis of an auditory sensory property for each detailed frequency band, the structure should not necessarily be limited to the above method of monotonously decreasing the value from low to high frequency bands. An important point here is that each frequency band is controlled independently.

The second signal generated in the above manner is mixed with the first signal in the mixing unit 50, by using mixing coefficients determined in the mixing coefficient determination unit 40. This operation can be realized in the same way as in the first embodiment.

As described above, according to this embodiment, a signal processing device for generating two signals by mixing a first signal and a second signal generated from the first signal based on two mixing degrees (two cases that are the case of mixing by the combination of h11 and h21, and the case of mixing by the combination of h12 and h22) includes: a generation unit which generates the second signal from the first signal; a mixing coefficient determination unit which determines the mixing degrees; and a mixing unit which mixes the first signal and the second signal based on the mixing degrees determined by the mixing coefficient determination unit. For a low frequency band of the first signal, the generation unit generates a signal by using a delay unit which delays by relatively large unit time N (N>0) and a complex-number all pass filter whose order P is relatively large. For a high frequency band of the first signal, the generation unit generates a signal by using a delay unit which delays by relatively small unit time n (or which does not delay at all) and a real-number all pass filter whose order p is relatively small (or simply rotating an input signal by 90 degrees or −90 degrees). Thus, when generating signals of 2 channels from a monaural signal, sharpness of a time variation of a sound and precise localization of a sound image can be realized, while providing spaciousness and producing favorable stereo signals. Furthermore, since high frequency band signal processing can be simplified, a reduction in computation amount can be achieved.

Though the second embodiment describes the case where a method of processing (an amount of delay and a filter order) each frequency band signal is fixed irrespective of a property of an input signal, this is not a limit for the present invention. The processing method may be switched in accordance with an input signal. One example is given below. A frequency band no larger than frequency band T is subject to a delay and all pass filtering, while a higher frequency band than T is subject to no delay and a filtering process that only rotates an input signal by 90 degrees or −90 degrees. In this structure, the value of T may be changed appropriately in accordance with an input signal.

The above first and second embodiments describe the case where, in the expressions for obtaining mixing coefficients h11, h21, h12, and h22, L is the level ratio of the original two signals before downmixing, and correlation coefficient r of the original two signals before downmixing represents cos (θ), so that mixing coefficients h11, h21, h12, and h22 are obtained using L and r, according to $$h11=d1*(L+r)/((1+L^2+2*L*r)^{0.5})$$

$$h12=d2*(1+L*r)/((1+L^2+2*L*r)^{0.5})$$

$$h21=d1*(1-r^2)^{0.5}/((1+L^2+2*L*r)^{0.5})$$

$$h22=-h21.$$

However, the above expressions are applicable even when r and L do not indicate the relationships between the original two signals.

For example, according to a virtual surround technique that has been widely studied and developed in recent years, it is considered that a reproduced sound field can provide an enhanced sense of surround, by controlling (changing) a phase difference and level ratio of two signals (Japanese Patent Application Publication No. 2005-161602 as one example). Suppose the level ratio is increased by 1.2 times and the phase difference is increased by n/4, in order to enhance the sense of surround of the reproduced sound field. In this case, by changing r and L to r' and L' as shown below and then applying such changed r and L to the above expressions, a sound reproduced by the signal processing device according to any of the embodiments can exhibit an enhanced sense of surround.

That is, L' and r' which are calculated according to $$L'=1.2*L$$

$$r'=r*\cos(n/4)-(1-r*r)\hat{}0.5*\sin(n/4)$$

are set as r and L. Here, the expression for calculating r' is derived from the following relationship (an addition theorem of a trigonometric function)

$$\cos(\theta+n/4)=\cos(\theta)*\cos(n/4)-\sin(\theta)*\sin(n/4).$$

However, any other method of rotating a phase angle is applicable.

The first and second embodiments describe a process of dividing a monaural signal which is obtained by downmixing two signals, into two signals. However, the present invention is not necessarily limited to a process relating to two signals. Suppose, from signals that are originally of 5.1 channels (front left (Lf), front right (Rf), surround left (Ls), surround right (Rs), center (C), and deep bass (LFE)), monaural signal M is obtained by downmixing Lf and Rf to signal F, downmixing Ls and Rs to signal S, downmixing C and LFE to signal CL, downmixing F and CL to signal FCL, and downmixing FCL and S to signal M. When dividing such monaural signal M by reversing these steps, the process of any of the embodiments may be applied to each division step.

Note here that the aforementioned steps are merely one example of reducing signals of a plurality of channels to fewer channels. For example, monaural signal M may be obtained by downmixing Lf and Ls to signal L, downmixing Rf and Rs to signal R, downmixing C and LFE to signal CL, downmixing L and R to signal LR, and downmixing LR and CL to signal M, so that such obtained monaural signal M is divided by reversing these steps.

The signal processing device according to the present invention is capable of decoding a coded signal that expresses a phase difference and a level ratio between a plurality of channels with a very small number of bits, while maintaining an acoustic property. Also, the signal processing device is capable of performing processing with a small amount of computation. Hence the present invention can be applied to music broadcasting services and music distribution services of low bit rates, and receivers of these music broadcasting services and music distribution services such as mobile phones and digital audio players.

The invention claimed is:

1. A signal processing device, comprising:

a generation circuit operable to generate a second signal from a first signal that is obtained by downmixing two signals;

a mixing coefficient determination circuit operable to determine, based on a value L and a value θ, a mixing degree for mixing the first signal and the second signal, the value L indicating a level ratio between the two signals, and the value θ indicating a phase difference between the two signals; and a mixing circuit operable to mix the first signal and the second signal based on the mixing degree determined by the mixing coefficient determination circuit, wherein the generation circuit includes:

a first filter circuit operable to generate a low frequency band signal in the second signal, from a low frequency band signal in the first signal; and a second filter circuit operable to generate a high frequency band signal in the second signal, from a high frequency band signal in the first signal, the first filter circuit is operable to generate the low frequency band signal in the second signal by, using a delay circuit and an all pass filter, (i) decorrelating a complex-number signal and (ii) adding a reverberation component to the complex-number signal, the complex-number signal being the low frequency band signal in the first signal, and the second filter circuit is different from the first filter circuit and is operable to generate the high frequency band signal in the second signal by, using an all pass filter, (i) decorrelating a real-number signal and (ii) adding a reverberation component to the real-number signal, the real-number signal being the high frequency band signal in the first signal.

2. The signal processing device according to claim 1, wherein the second filter circuit is an orthogonal rotation filter operable to rotate a phase by 90 degrees or −90 degrees.

3. The signal processing device according to claim 1, wherein the mixing coefficient determination circuit is operable to obtain four mixing coefficients h11, h12, h21, and h22, and when, in a parallelogram where an angle formed by two adjacent sides is the value θ and a ratio in length of the two adjacent sides is the value L, angles obtained by dividing the angle θ by a diagonal of the parallelogram are denoted by A and B, and values determined according to the level ratio L are denoted by d1 and d2, the mixing coefficient determination circuit is operable to:

obtain the mixing coefficient h11 as d1*cos(A);

obtain the mixing coefficient h12 as d2*cos(B);

obtain the mixing coefficient h21 as d1*sin(A) or d2*sin (B); and obtain the mixing coefficient h22 as −h21.

4. The signal processing device according to claim 3, wherein, when a quantized value indicating the value θ is denoted by qθ and a quantized value indicating the value L is denoted by qL, the mixing coefficient determination circuit is operable to:

receive the quantized value qθ and the quantized value qL, and convert the received quantized value qθ and quantized value qL to a value r and the value L respectively, the value r representing cosθ; and obtain the mixing coefficients h11, h12, h21, and h22 according to:

$$h11=d1*(L+r)/((1+L^2+2*L*r)^{0.5})$$

$$h12=d2*(1+L*r)/((1+L^2+2*L*r)^{0.5})$$

$$h21=d1*(1-r^2)^{0.5}/((1+L^2+2*L*r)^{0.5})$$

$$h22=-h21.$$

5. The signal processing device according to claim 3, wherein, when a quantized value indicating the value θ is denoted by qθ and a quantized value indicating the value L is denoted by qL, the mixing coefficient determination circuit includes a table that has the quantized value qθ and the quantized value qL as addresses, and is operable to:

obtain the mixing coefficients h11, h12, and h21, using the table; and obtain the mixing coefficient h22 according to h22=−h21.

6. The signal processing device according to claim 1, wherein the mixing coefficient determination circuit is operable to obtain four mixing coefficients h11, h12, h2, and h22, and when a real part and an imaginary part of the first signal expressed by a complex number are respectively denoted by r1 and i1, and a real part and an imaginary part of the second signal expressed by a complex number are respectively denoted by r2 and i2, said mixing is operable to:

set h11*r1+h21*r2 as a real part of a first output signal;

set h11*i1+h21*i2 as an imaginary part of the first output signal;

set h12*r1+h22*r2 as a real part of a second output signal; and set h12*i1+h22*i2 as an imaginary part of the second output signal.

7. The signal processing device according to claim 1, wherein the mixing coefficient determination circuit is operable to obtain four mixing coefficients h11, h12, h21, and h22, and when a value of the first signal expressed by a real number is denoted by rl and a value of the second signal expressed by a real number is denoted by r2, the mixing circuit is operable to:

set h11* r1+h21*r2 as a first output signal; and set h12* r1+h22*r2 as a second output signal.

8. A signal processing method, comprising:

a generation step of generating, using a generation circuit, a second signal from a first signal that is obtained by downmixing two signals;

a mixing coefficient determination step of determining, based on a value L and a value θ, a mixing degree for mixing the first signal and the second signal and using a mixing coefficient determination circuit, the value L indicating a level ratio between the two signals, and the value θ indicating a phase difference between the two signals; and a mixing step of mixing, using a mixing circuit, the first signal and the second signal based on the mixing degree determined in the mixing coefficient determination step, wherein the generation step includes:

a first filter step of generating, using a first filter circuit, a low frequency band signal in the second signal, from a low frequency band signal in the first signal; and a second filter step of generating, a second filter circuit, a high frequency band signal in the second signal, from a high frequency band signal in the first signal, the first filter step includes generating the low frequency band signal in the second signal by, using a delay step and an all pass filter step, (i) decorrelating a complex-number signal and (ii) adding a reverberation component to the complex-number signal, the complex-number signal being the low frequency band signal in the first signal, and the second filter step is different from the first filter step and includes generating the high frequency band signal in the second signal by, using an all pass filter, (i) decorrelating a real-number signal and (ii) adding a reverberation component to the real-number signal, the real-number signal being the high frequency band signal in the first signal.

* * * * *